United States Patent

[11] 3,591,263

| [72] | Inventor | Kurt Esterson<br>Rabenstr. 4a, 844, Straubing, Germany |
|---|---|---|
| [21] | Appl. No | 003,562 |
| [22] | Filed | Jan. 8, 1970 |
| [45] | Patented | July 6, 1971 |
| [32] | Priority | Oct. 1, 1965 |
| [33] |  | Germany |
| [31] |  | E 30189 IX/42L |
|  |  | Continuation of application Ser. No. 577,859, Sept. 8, 1966, now abandoned. |

[54] PROTECTIVE GLASSES
3 Claims, 1 Drawing Fig.

[52] U.S. Cl..................................... 351/44, 350/311
[51] Int. Cl..................................... G02c 7/10
[50] Field of Search........................... 351/41, 44, 49, 57, 58, 162, 163; 2/13, 14.9; 350/132, 311

[56] References Cited
UNITED STATES PATENTS

| 1,422,527 | 7/1922 | Berger | 350/132 |
| 2,421,609 | 6/1947 | Good | 350/132 |
| 3,221,599 | 12/1965 | Land | 350/132 |

FOREIGN PATENTS

| 1,134,943 | 12/1956 | France | 351/45 |
| 403,067 | 5/1933 | Great Britain | 351/45 |
| 538,830 | 8/1941 | Great Britain | 2/14 |
| 706,196 | 3/1954 | Great Britain | 351/45 |

*Primary Examiner*—David Schonberg
*Assistant Examiner*—Robert L. Sherman
*Attorney*—McGlew and Toren ABSTRACT: Protective glasses for reducing glare and providing enhanced vision under unfavorable conditions, the improvement consisting of making the two lenses of different colors, one of orange to reddish and the other of yellow tint.

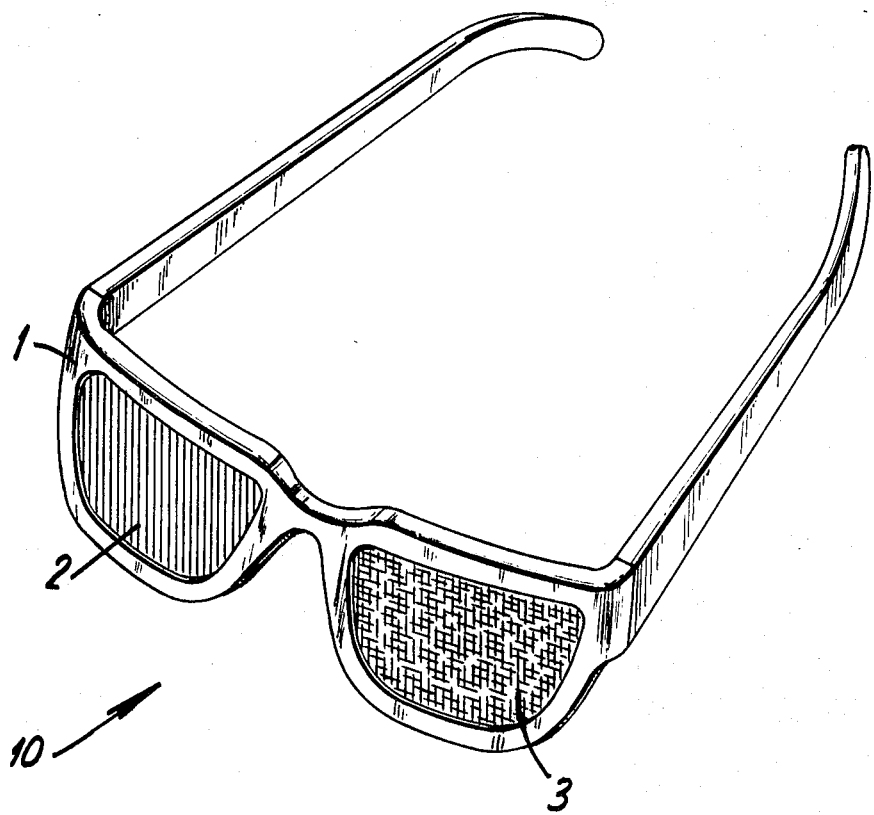

PROTECTIVE GLASSES

This is a continuation application of application Ser. No. 577,859, filed Sept. 8, 1966, and now abandoned.

This invention generally relates to spectacles and is particularly directed to glare reducing protective spectacles or glasses.

Protective spectacles of the indicated kind have become known in various forms and constructions. In order to protect or shield the eyes against direct or reflected sunlight, spectacles with lenses of darkish color or tint are customarily used. Such glare reducing spectacles, however, are not suitable for use at dusk or twilight since, due to their dark tint, the lenses do not permit the passage of sufficient light at relatively low ambient light levels. Further, such glasses are unsuitable to protect the eyes in respect to light which is reflected by fog or haze, a fact which is known to motor vehicle drivers whose field of vision is within the light beam of oncoming cars traveling through fog. This is so because customary darkish protective glasses have too pronounced a filtering effect in respect to fog reflected light and have a tendency to blur the existing contrasts. Many car accidents have thus been caused in foggy conditions by drivers wearing ordinary sun or protective glasses.

So-called snow glasses or spectacles are known wherein the lenses have a relatively light, preferably yellowish, tint. While, of course, spectacles fitted with snow lenses do not filter out the light to the same extend as lenses of dark tint or color, such snow spectacles are not very efficient in respect to very strong light sources and do not permit glare-free viewing in strong sun light.

Generally, it is a primary purpose of glare reducing spectacles to increase the effectiveness of the viewing capability of the eye under unfavorable conditions. For this purpose, the three basic characteristics of viewing have to be enhanced, to wit, the capability of the eye to perceive and distinguish contrast, the capability and sensitivity of the eye to perceive and distinguish form and the response time of the eye to perceive images, also referred to as the perception speed. The capability to perceive or distinguish contrasts makes it possible for the eye to perceive differences in the light density or brightness, to wit, contrasts. The capability to recognize form, to wit, the visual acuity, increases with the contrast of the objects viewed and also with the luminous intensity or brightness. The response time or speed of perception is the capability of the eye to perceive rapidly changing images. This characteristic of the eye also increases with the contrast and with the luminous intensity or brightness of the respective objects. Since the luminous intensity or the brightness generally cannot be influenced by the viewer, for example, in street traffic almost never, the main purpose of protective spectacles is to help the eye of the observer in the perception of differences in the brightness, to wit, of contrasts.

Accordingly, it is a primary object of the present invention to provide glare reducing protective spectacles of the indicated kind which overcome the drawbacks and disadvantages of the known protective spectacles and, moreover, enhance the vision of the viewer by increasing the contrast under unfavorable conditions, to wit, under conditions of glare, fog, haze and the like.

Another object of the invention is to provide protective spectacles of the indicated kind which avoid a reduction in the visual acuity of the viewer caused by artificial light sources.

Generally, it is an object of the invention to improve on the art of glare reducing protective spectacles as presently practiced.

Briefly, and in accordance with this invention, glare reducing protective spectacles are fitted with lenses, one of which has a reddish or orange tint while the other lens is of yellow color. The lenses may, of course, be imparted with the respective colors or tints, or transparent filter lenses of the indicated colors may be placed in front of ordinary uncolored lenses.

In accordance with this invention, it has been ascertained that by using different, but related colors, different colors are filtered out by the respective lenses, thereby increasing the contrasts.

The inventive spectacles are also suitable for use in industrial plants and for operations, such as welding and the like, in which protective glasses generally are used. For such purposes, the inventive protective spectacles, as compared to the prior art constructions, have the advantage that they protect the eye against any kind of glare, but on the other hand do not darken excessively so that viewing without strain is rendered possible for an extended period of time. Experiments have indicated that for industrial purposes the best results are obtained if one of the lenses has a reddish tint while the other one is dark yellow.

Extensive tests have indicated that, particularly in respect to protective spectacles used by motor car drivers in street or highway traffic, the best results are obtained if one of the lenses is orange while the other one is lemon yellow. This combination on the one hand gives sufficient protective effect in respect to glare while, on the other hand, a sufficiently brightness-increasing, contrast-creating effect is obtained at dusk or under foggy conditions.

Generally, it is of no consequence in what manner the filter lenses are arranged in the protective spectacles. Thus, the darker filter may optionally be the right-hand or left-hand lens. However, in respect to persons who have slight vision deficiencies in one or the of the eye, it is recommended that the filter disc of lighter tint or color be associated with the eye of lesser viewing efficiency.

The various features of novelty which characterize the invention are pointed out with particularity in the claims annexed to and forming a part of this specification. For a better understanding of the invention, its operating advantages and specific objects attained by its use, reference should be had to the accompanying drawing in which there is illustrated and described a preferred embodiment of the invention.

The single figure of the drawing is a perspective view of a pair of spectacles.

Referring now to the drawing, reference numeral 10 indicates spectacles comprising an ordinary spectacle frame 1. One of the lenses, to wit, 2, has a reddish or orange tint while the other lens 3 is yellow. Instead of using spectacles wherein the lenses are tinted, an ordinary pair of spectacles can be used in conjunction with transparent filter discs of the indicated colors which are placed in front of the lenses.

What I claim is:

1. In protective spectacles for reducing glare and providing enhanced vision, the improvement which comprises that the entire surface of one of the lenses has an orange to reddish tint whereas the entire surface of the other lens has a yellow tint.

2. The improvement as claimed in claim 1, wherein one of the lenses is orange while the other one is lemon yellow.

3. The improvement as claimed in claim 1, wherein one of the lenses is reddish and the other one is dark yellow.